(12) United States Patent
Silva et al.

(10) Patent No.: US 9,466,997 B2
(45) Date of Patent: Oct. 11, 2016

(54) SYSTEM FOR PRE-CHARGING A CAPACITOR BY A BATTERY

(71) Applicant: SAFT, Bagnolet (FR)

(72) Inventors: Guillaume Dinand Da Silva, Bordeaux (FR); Serge Maloizel, Trois Palis (FR)

(73) Assignee: SAFT, Bagnolet (FR)

( * ) Notice: Subject to any disclaimer, the term of this patent is extended or adjusted under 35 U.S.C. 154(b) by 131 days.

(21) Appl. No.: 14/076,630

(22) Filed: Nov. 11, 2013

(65) Prior Publication Data

US 2014/0139194 A1    May 22, 2014

(30) Foreign Application Priority Data

Nov. 12, 2012  (FR) ..................................... 12 60738

(51) Int. Cl.
*H02J 7/00*     (2006.01)
*H02M 3/06*    (2006.01)
*H02M 1/36*    (2007.01)
*H02J 7/34*     (2006.01)

(52) U.S. Cl.
CPC .............. *H02J 7/0052* (2013.01); *H02J 7/345* (2013.01); *H02M 1/36* (2013.01); *H02M 3/06* (2013.01)

(58) Field of Classification Search
CPC .......... H02J 7/00; H02J 7/0052; H02J 7/345; H02M 3/06; H02M 1/36
USPC ........................................... 320/166; 307/109
See application file for complete search history.

(56) References Cited

U.S. PATENT DOCUMENTS

| | | | | |
|---|---|---|---|---|
| 3,663,876 A * | 5/1972 | McBride et al. | ............. | 318/795 |
| 5,666,042 A * | 9/1997 | Lewis | ............................. | 320/163 |
| 5,977,721 A * | 11/1999 | Nilssen | .................. | H02M 1/425 |
| | | | | 315/205 |
| 5,986,898 A * | 11/1999 | Meitzner | .................. | H02M 1/40 |
| | | | | 363/21.04 |
| 6,020,724 A * | 2/2000 | O'Loughlin | ............ | H02J 7/345 |
| | | | | 320/166 |
| 6,021,053 A * | 2/2000 | Baskette et al. | ................ | 363/40 |
| 6,057,665 A * | 5/2000 | Herniter et al. | ................ | 320/101 |
| 6,266,260 B1 * | 7/2001 | Zahrte et al. | .................. | 363/132 |
| 6,314,002 B1 * | 11/2001 | Qian et al. | ................... | 363/21.04 |
| 6,388,394 B1 * | 5/2002 | Mita et al. | ...................... | 315/291 |
| 6,584,197 B1 * | 6/2003 | Boudreaux et al. | ..... | 379/413.02 |
| 6,977,485 B1 * | 12/2005 | Wei | ................................. | 320/139 |
| 7,075,194 B2 * | 7/2006 | Weidenheimer et al. | ...... | 307/71 |
| 7,127,288 B2 * | 10/2006 | Sturman | .................. | A61N 1/08 |
| | | | | 320/166 |
| 7,932,686 B2 | 4/2011 | Tsuchiya et al. | | |
| 8,415,905 B2 * | 4/2013 | Sean et al. | ..................... | 318/139 |
| 8,432,064 B2 * | 4/2013 | Maeda | ....................... | H02J 7/34 |
| | | | | 307/44 |
| 2003/0076041 A1 * | 4/2003 | Honda et al. | ................. | 313/634 |
| 2005/0014602 A1 | 1/2005 | Hara et al. | | |
| 2007/0096564 A1 * | 5/2007 | Maeda | ...................... | H02J 7/34 |
| | | | | 307/87 |
| 2007/0216390 A1 * | 9/2007 | Wai et al. | ...................... | 323/351 |

(Continued)

FOREIGN PATENT DOCUMENTS

| | | | | | | |
|---|---|---|---|---|---|---|
| JP | | 04067778 A | * | 3/1992 | .............. | H02M 7/06 |
| JP | | 07322639 A | * | 12/1995 | .............. | H02M 7/48 |

(Continued)

*Primary Examiner* — Phallaka Kik
(74) *Attorney, Agent, or Firm* — Sughrue Mion, PLLC

(57) ABSTRACT

There is provided a system for pre-charging a capacitor by means of a battery, including a switch and an element for limiting charging current of the capacitor, said switch and said limiting element being connected whereby a charging current from the battery to the capacitor may pass through said switch and said limiting element, which is characterized in that the limiting element for limiting the charging current of the capacitor is an energy transfer device.

21 Claims, 2 Drawing Sheets

(56) References Cited

U.S. PATENT DOCUMENTS

| | | |
|---|---|---|
| 2008/0150369 A1 | 6/2008 | Suzuki et al. |
| 2009/0108908 A1* | 4/2009 | Yamadaya .................... 327/390 |
| 2009/0309554 A1* | 12/2009 | Fischer ........................ 320/166 |
| 2010/0164278 A1 | 7/2010 | Oyobe et al. |
| 2010/0301829 A1* | 12/2010 | Bulteau ........................ 323/304 |
| 2010/0331682 A1* | 12/2010 | Stein .................... A61B 5/4528 600/437 |
| 2011/0133694 A1* | 6/2011 | Song ............................ 320/109 |
| 2011/0199057 A1* | 8/2011 | Ivanov et al. ................ 320/162 |
| 2012/0194090 A1* | 8/2012 | Esaki et al. ............... 315/200 R |
| 2013/0023943 A1* | 1/2013 | Parramon et al. ................ 607/2 |
| 2013/0183043 A1* | 7/2013 | Elberbaum ................... 398/115 |

FOREIGN PATENT DOCUMENTS

| | | | | |
|---|---|---|---|---|
| JP | 2001168430 A | * | 6/2001 | ............ H01S 3/097 |
| JP | 2003287228 A | * | 10/2003 | ............... F23Q 3/00 |
| JP | 2004343879 A | * | 12/2004 | ............... H02J 7/02 |
| KR | 100 992 587 B1 | | 11/2010 | |

* cited by examiner

Prior Art

SYSTEM FOR PRE-CHARGING A CAPACITOR BY A BATTERY

BACKGROUND OF THE INVENTION

Field of the Invention

The present invention relates to the field of systems for pre-charging a capacitor having a high capacitance value by a battery, to the field of systems for charging a capacitor by a battery incorporating a system for pre-charging this capacitor by the battery as well as to the field of methods for pre-charging a capacitor by a battery.

A pre-charging system is a system which is connected in parallel with a switch or a main switch and which is responsible for charging the input capacitor of a device which is connected to a battery. Regardless of whether pre-charging or charging of the capacitor is concerned, we shall use the term charging current and not pre-charging current in the remainder of this specification, even during the pre-charging phase of the capacitor.

If this pre-charging system were not present, closing the main switch directly into the input capacitor of the device connected to the battery would bring about such a large inrush current that there would be a risk of damaging the contact of the switches or main switches. This damage could even go so far as to cause the contacts of the switch to stick or weld together thereby rendering subsequent disconnection of the system from the battery impossible without damaging or even destroying the switch.

As disclosed in U.S. Pat. No. 7,932,686, a system is known for pre-charging the input capacitor of a device connected to a battery which is principally constituted by a switch and a resistance for limiting the charging current of this capacitor. The pre-charging system is arranged in parallel with a main switch which controls the actual system for charging the capacitor. The dimensioning of this system for pre-charging requires a trade-off between firstly, the power which will be dissipated in the charging current limiting resistor and consequently the size of this charging current-limiting resistor and, secondly, the amount of pre-charging time necessary for a sufficient pre-charge of the capacitor. As a consequence, in a system where constraints are high, and where there are heavy demands on desired performance, either the pre-charging time is set at a small value at the price of a relatively large charging current limiting resistor, thereby being simultaneously complex and expensive, or the charging current limiting resistor is limited to a reasonable size at the expense of a pre-charging time which remains lengthy, and frequently too long.

More precisely, in this first instance of the prior art, the dimensioning of the pre-charging system results from a trade-off between, firstly, power which will be dissipated in the resistor and consequently the size thereof and, secondly, the desired pre-charging time.

In effect, pre-charging obeys the laws applying to charging of a capacitor through a resistance, $V\_capacitor = V\_battery \times (1-e^{-t/RC})$ with V_capacitor being the voltage across the capacitor and V_battery is the terminal voltage of the battery, R is the value of the voltage limiting resistor and C is the value of the capacitor, and t is time.

Additionally, we have $I\_resistance = V\_battery/R \times e^{-t/RC}$, with I_resistance being the charging current flowing through the charging current limiting resistor during pre-charging of the capacitor, which gives:

a pre-charging time equal to $5 \times R \times C$
an initial current equal to $V battery/R$
an average power dissipated in the resistance equal to: $\frac{1}{2} \times C \times Vbattery^2/(5 \times R \times C)$.

It will be seen that in order to limit charging current in the initial stage of pre-charging, as well as for limiting average power dissipated in the charging current limiting resistor, it is always necessary to increase the value of the charging current limiting resistor, the effect of which is to increase pre-charging time.

Conversely, for smaller values of this charging current limiting resistor, the previous parameters vary in the inverse sense, and it is now the size and cost of the resistor which will become too high. It is true that a trade-off can be achieved, and is achieved, in the prior art, but in the case of a high-performance device, the trade-off does rapidly become extremely expensive.

According to a second instance of the prior art disclosed in European patent application 2,400,649, a pre-charging system is known which, functionally, is equivalent to the one discussed above, in which the charging current limiting resistor for charging the capacitor is in the form of a field-effect transistor operating in variable-resistance mode, set at a mean impedance value. The essential component performing charging current limitation during pre-charging of the capacitor is a resistor.

SUMMARY OF THE INVENTION

The aim of the present invention is to provide a pre-charging system which at least partially overcomes the drawbacks discussed above.

More particularly, the invention sets out to provide a system for pre-charging a capacitor by a battery via a charging current limiting element which guarantees high performance, a short pre-charging time, a limited inrush charging current at the start of charging and/or modest power dissipation in the charging current limiting element, all these effects being obtained using a charging current limiting element which is relatively simple and inexpensive, and at the least more cost-effective than a voluminous and high-performance charging current limiting resistor.

Instead of limiting pre-charging current of the capacitor using a resistor, the pre-charging system which is the subject matter of this invention advantageously provides for the use of a switching or chopper system based on a switch and an inductance.

This pre-charging system advantageously makes it possible to reduce the power needed to be dissipated in the charging current limiting element, to reduce pre-charging time of the capacitor and, as a consequence, to make the power from the battery more rapidly available for subsequent charging operations, or even for use thereof. This pre-charging system also has the useful advantage of occupying a smaller volume, and being less expensive when compared to the two systems of the prior art discussed above, but for an equivalent level of performance.

In effect, the system according to the invention has the advantage of being based on an energy transfer system, which brings about a much lower power dissipation in the components thereof when compared to a system using resistors in the two examples of the prior art discussed above. As a result, the system will occupy a much smaller volume.

Additionally, in the two examples of the earlier art discussed above, the charging current limiting element is provided in the form of discrete components connected by wiring leads and mounted along with the electro-technical units. The pre-charging system according to the present invention can advantageously be directly integrated into a Battery Management System (BMS) using components which are directly integrated onto a printed circuit. This, in this advantageous situation, provides a supplementary advantage of compactness, along with a supplementary advantage arising from the relevant cost thereof.

All the above discussed advantages can lead to a very significant reduction in the cost of this pre-charging system. In a preferred example of an application to a low-voltage battery, the pre-charging system implemented using a switch and a power resistor to limit charging current, of around 150 W and corresponding to a system of the type in the prior art using a charging current limiting resistor can cost up to three times the cost of a pre-charging system based on the use of an inductor or inductance as the charging current limiting element, in conformity with one aspect of the invention.

To achieve this aim, the present invention provides a system for pre-charging a capacitor by a battery, comprising a switch and a limiting element for the charging current of said capacitor which are arranged whereby a charging current circulating between said battery and the capacitor may pass therethrough, characterized in that the limiting element for limiting charging current of said capacitor is an energy transfer device. By comparison, the pre-charging systems of the prior art are energy dissipation devices.

To achieve this aim, the present invention also provides a system for pre-charging a capacitor by a battery, comprising a switch and a limiting element for the charging current of the capacitor which are arranged whereby a charging current circulating between the battery and the capacitor may pass therethrough, characterized in that the limiting element for limiting charging current of the capacitor is an inductance.

To achieve this aim, the present invention further provides a system for pre-charging a capacitor by a battery, comprising a switch and a limiting element for the charging current of the capacitor which are arranged whereby a charging current circulating between the battery and the capacitor may pass therethrough, characterized in that the device for limiting charging current of the capacitor includes an inductor which is responsible for the majority, preferably the essential part of the capacitor charging current limiting effect.

To achieve this aim, the present invention further provides a method for pre-charging a capacitor by a battery via a limiting element for limiting a charging current to the capacitor, including the steps of alternately: charging the limiting element by the battery and discharging the limiting element into the capacitor.

In preferred embodiments, the invention includes one or several of the following characteristics which may be employed separately or in partial combination or in total combination therebetween.

Preferably, the switch and the limiting element for limiting charging current of the capacitor constitute a system for chopping a current for charging the capacitor. When the switch is open, the charging current limiting element is able to store the energy originating from the battery. When the switch is closed, it allows the charging current limiting element to restitute the stored energy and supply it to the capacitor or capacitance to be pre-charged.

Preferably, the chopping frequency is greater than one kHz, more preferably greater than some tens or hundreds of kHz. This high chopping frequency makes it possible to ramp up the voltage across the capacitor progressively and smoothly, during the pre-charging phase.

Preferably, control of the switch is arranged whereby the switch is alternately closed and opened in order to alternately charge the inductance and discharge the inductance into the capacitor. It is the inductance or inductor which acts as the buffer element performing energy transfer between the battery and the capacitor.

Preferably, control of the switch is arranged whereby the switch is alternately opened and closed at a periodic frequency, preferably greater than one kHz, more preferably greater than some tens or hundreds of kHz Preferably, control of the switch is arranged whereby the switch is alternately closed and opened in order to alternately charge the inductance up to a first predetermined threshold current value and discharge the inductance into the capacitor down to a second predetermined current threshold value which is strictly below the first threshold value, the second threshold value being preferably less than half the first threshold value. This relatively large difference between the two threshold values which initiate changeover between the charging and discharge phases throughout the period of pre-charging of the capacitor makes it possible for the charging current limiting element, which is preferably an inductance or inductor, to store and restitute, in other words transfer, a notable amount of electrical energy at each occasion.

Preferably, the pre-charging system also includes a resistor connected in series between the inductance and the capacitor. This association of inductance and resistance makes it possible to better regulate the recharging current of the inductance and the discharge current of the inductance into the capacitor during the pre-charging phase, since charging and discharging is performed via this resistor, and not directly.

Preferably, this resistor has a value comprised between 10 mohms and 1 ohm.

Preferably, the pre-charging system includes a diode connected in series between the inductance and the capacitor, so as to only allow current to pass in the direction from the inductance to the capacitor, notably when the transistor of the switch is of the FET or MOSFET type. Thus, the fact of connecting a battery charger in the place of the capacitor prevents recharging of the battery via the pre-charging system occurring, on the contrary obliging recharging of the battery to proceed via the charging system: this is a precautionary measure.

Preferably, the switch is a transistor commanded by pulse width modulation. This type of control is typically particularly well-suited to the frequency range, which is relatively high, of the chopping or switching which is preferably envisaged.

Preferably, the pre-charging system is a system for pre-charging a low voltage battery, preferably a battery the terminal voltage of which is less than 100 V, even more preferably a battery the terminal voltage of which is less than 70 volts. The pre-charging system according to the invention can be used just as well for high voltage batteries as well as for low voltage batteries. Nevertheless, implementation on high voltage batteries will be somewhat more complex, as this would require the use of high withstand voltage components and, consequently, the gains in simplicity and cost would be less significant than the gain achieved in the case of a low voltage battery. Nevertheless, this may prove useful at least in certain high voltage applications, in particular when the dimensions of the system must be kept low.

The invention also provides a system for charging a capacitor by a battery, comprising a main switch connected in parallel with a system for pre-charging the capacitor by the battery according to the invention, and in which control of the main switch is arranged whereby the main switch is open when the pre-charging system is functioning, the main switch preferably directly connecting the battery to the capacitor.

Preferably, this inductance has a value comprised between 10 microhenry and 1 millihenry.

Preferably, alternation of the charging step and the discharge step is performed several times, preferably several times per second, during the pre-charging of the capacitor, still more preferably with a frequency greater than one kHz, more preferably greater than some tens or hundreds of kHz.

Further characteristics and advantages of the invention will become more clear from the following description of a preferred embodiment of the invention, given by way of example and with reference to the accompanying drawings.

BRIEF DESCRIPTION OF THE DRAWINGS

FIG. 1 shows diagrammatically one example of a charging system for a capacitor by means of a battery which includes a pre-charging system according to the prior art. A battery 11 is used to charge a capacitor 12 with electrical energy. Charging can be performed either via a pre-charging system or via an actual charging system in other words via a main switch 17; in practice, firstly, in an initial period, this is done via the pre-charging system and then, over a second period, via the actual charging system itself.

Figure 1:
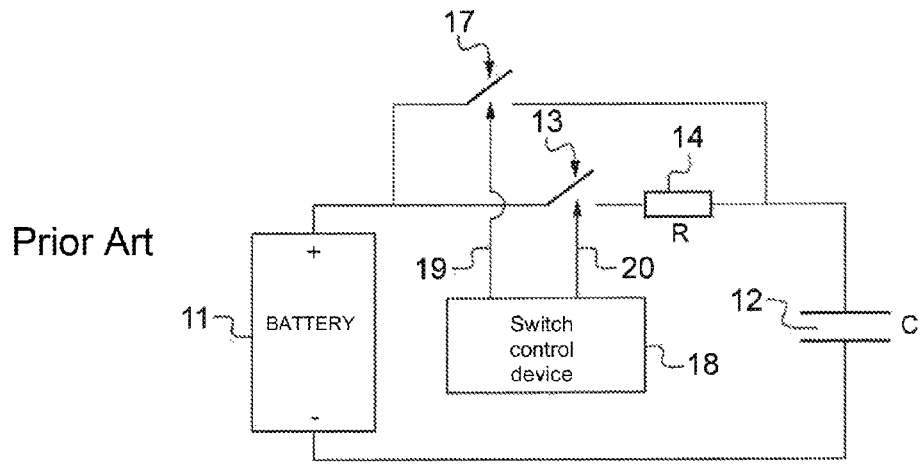
FIG. 1 shows diagrammatically an example of a charging system of a capacitor by a battery, including a pre-charging system according to the prior art.

The pre-charging system comprises a series circuit consisting of a switch 13 and a resistor 14, as well as that portion of a control system 18 for the switches which is responsible for opening and closing switch 13. The pre-charging system is located between the positive pole of battery 11 and one of the terminals of capacitor 12. Downstream of capacitor 12, a user device is located which, for reasons of simplicity is not shown in the diagram, which will consume the energy stored in capacitor 12.

The charging system comprises a main switch 17 as well as that portion of the control device 18 for the switches responsible for opening and closing main switch 17, as well as the pre-charging system. The charging system is located between the positive pole of battery 11 and the same terminal of capacitor 12 as the pre-charging system. The main switch 17 of the charging system is connected in parallel with the pre-charging system. Control system 18 has several interface connections, 19 and 20. Interface connection 19 controls the main switch 17. Interface connection 20 controls switch 13.

During an initial period, switch 13 is closed while main switch 17 is open. Pre-charging of capacitor 12 by battery 11 via resistor 14 is performed up until the voltage across capacitor 12 is close to that across the terminals of battery 11. Pre-charging time is for a period of about 5τ with rate τ equal to RC, R being the value of the resistor 14 and C the value of the capacitor 12. In a second period, main switch 17 is closed while switch 13 is open. Charging of capacitor 12 is maintained directly by battery 11.

Figure 2:
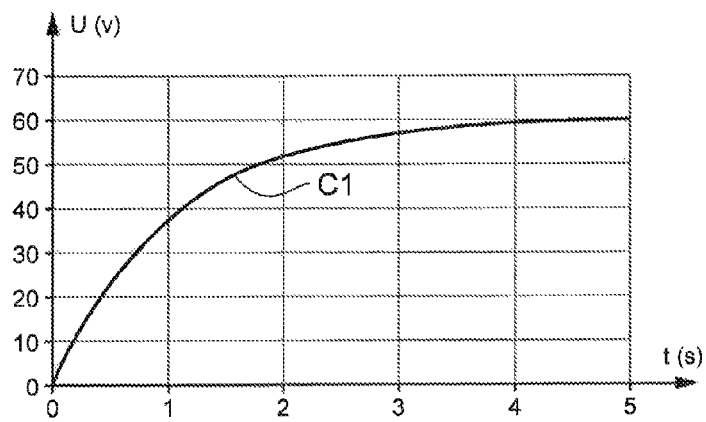
FIG. 2 shows diagrammatically one example of a pre-charging curve using a pre-charging system, for charging a capacitor by a battery according to the prior art.

FIG. 2 shows diagrammatically an example of a pre-charging curve using a pre-charging system according to the prior art, for charging a capacitor with a battery. Curve C1 shows the shape of the voltage U, expressed in volts V, across a capacitor 12 with a value of 50 mF, pre-charged via a 20Ω resistor 14, as a function of time t expressed in seconds s.

Curve C1 is a theoretical pre-charging curve; in reality, this stops after a certain period of time (for example 2 seconds) to then continue to actual charging, but the target voltage of 60 V is not achieved, the voltage which is achieved in effect barely exceeds 50 V. It would take too long to wait for the target voltage of 60 V or even a voltage relatively close thereto to be achieved.

Figure 3:
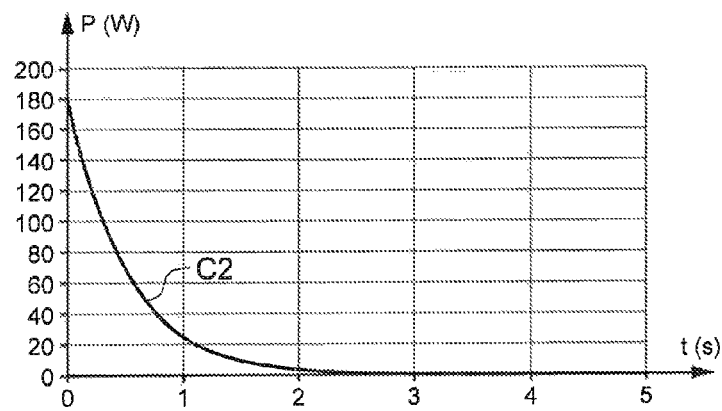
FIG. 3 shows diagrammatically an example of a curve for power dissipation into a current limiting resistor in a pre-charging system according to the prior art, when pre-charging a capacitor from a battery.

FIG. 3 shows diagrammatically an example of a power dissipation curve into the current limiting resistor of a pre-charging system according to the prior art, when pre-charging a capacitor by a battery. Curve C2 shows the shape of instantaneous power P in watts W, being dissipated in the 20Ω resistor during pre-charging of capacitor 12 of a value of 50 mF from a 60 V battery 11. It can be seen that the initial value of 180 W is extremely high even though, following this, it does have a tendency to drop off relatively rapidly.

DETAILED DESCRIPTION OF A PREFERRED EMBODIMENT

Figure 4:
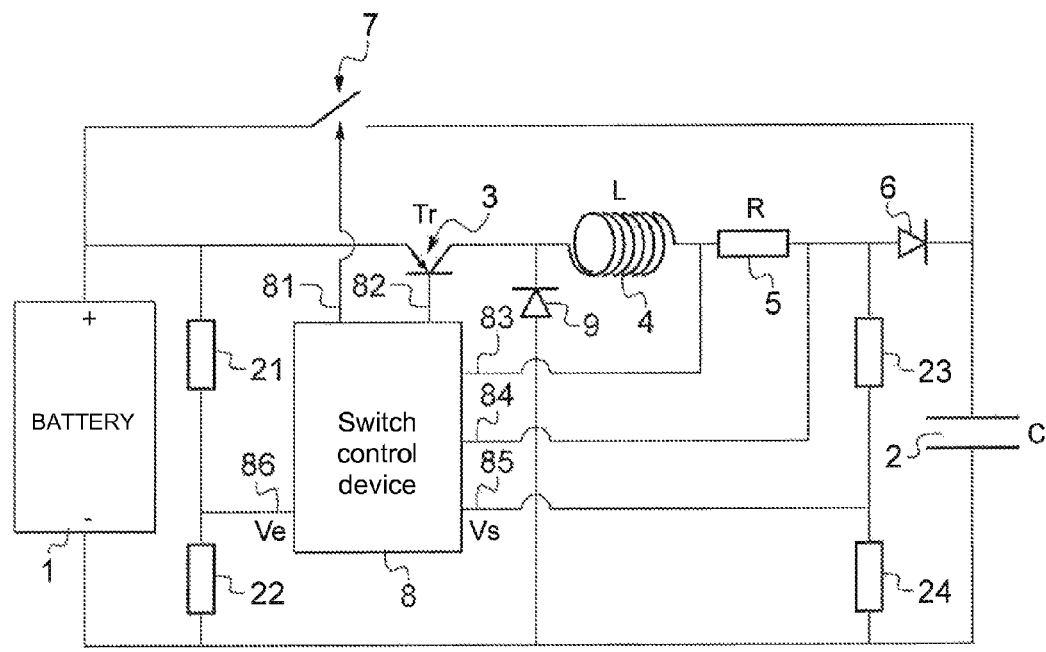
FIG. 4 shows diagrammatically one example of the charging system of a capacitor by a battery, that includes a pre-charging system according to the invention.

FIG. 4 shows diagrammatically an example of a charging system including a pre-charging system according to the invention for charging a capacitor from a battery. Battery 1 is intended to charge a capacitor or capacitance 2 with electrical energy. Charging can be achieved either via a pre-charging system or via an actual charging system; in actual fact, this is firstly done during an initial period via the pre-charging system and then, in the subsequent period, via the actual charging system.

The pre-charging system consists of a series circuit consisting of a switch 3 which is advantageously a transistor Tr followed by an inductance 4 connected firstly to a resistor 5 followed by a diode 6, in its forward conducting direction towards capacitor 2, and secondly to that portion of the control device 8 for the switches which is responsible for opening and closing switch 3. The emitter of bipolar transistor Tr is connected to battery 1, its collector is connected to inductance 4, its base being connected to one of the interface connections of control device 8. Instead of a bipolar transistor, switch 3 could employ a field effect transistor. Diode 6 prevents battery 1 from being recharged via the pre-charging system in the case where a battery charger is connected in the place of capacitor 2 and switch 3 takes the form of a field effect transistor, using for example MOSFET or FET technology. The switch 3, control device 8, inductance 4 and diode 9 perform the function of a DC/DC converter and switch 3 is responsible for chopping or interrupting the electrical supply in order to provide alternation between charging of inductance 4 and discharging of inductance 4. The pre-charging system is located between the positive pole of battery 1 and one of the terminals of capacitor 2. A user device is located downstream of capacitor 2 and this is not illustrated for reasons of simplicity, its function being to use the energy stored in capacitor 2.

In a preferred numerical example, resistance 5 whose value is preferably between 10 mohms and 1 ohm, preferably between 50 mohms and 1 ohm, has for example a value of 0.5 ohm. The inductance 4, whose value is preferably less than 1 millihenry, has for example a value of 47 microhenry. The value of the inductance 4 is preferably between 10 microhenry and 1 millihenry.

The charging system includes a main switch 7 together with the portion of the control device 8 for the switches, providing for opening and closing of main switch 7, along with the pre-charging system. The charging system is located between the positive pole of battery 1 and the same terminal of capacitor 2 as the pre-charging system. The main switch of the charging system is in parallel with the pre-charging system.

Control system 8 has several interface connections 81 to 86. Interface connection 81 controls the main switch 7. Interface connection 82 controls switch 3, and more precisely the base of bipolar transistor 3. Interface connections 83 and 84 are used to measure voltage drop across resistor 5, this voltage drop enabling control device 8 to determine the current passing through resistor 5. It is this value of current passing through resistor 5 which is employed, when this exceeds predetermined threshold values, for controlling opening and closing of switch 3 via interface connection 82. Interface connection 85 gives the output voltage Vs of control device 8. Interface connection 86 gives the input voltage Ve of control device 8.

The input and output voltages Ve and Vs of control device 8 are distinctly smaller than the voltage of battery 1. The input and output voltages Ve and Vs of control device 8 are of the order of 5 to 10 V and well below the voltage of battery 1 which typically has a value of 60 V. This is the reason for the use, firstly, at the input to control device 8 of a first voltage divider bridge comprising resistors 21 and 22 and, secondly, at the output of control device 8, of a second voltage divider bridge including resistors 23 and 24. One end of diode 9 is connected to the negative terminal of battery 1 and the other end thereof is connected to the point of junction between switch 3 and inductance 4, the forward conducting sense of diode 9 being from the negative pole of battery 1 to the point of junction between switch 3 and inductance 4.

During an initial period, switch 3 is switching (rapid opening/closing) while main switch 7 is open. Pre-charging of capacitor 2 by battery 1 via switch 3, inductance 4, diode 9 and resistor 5 occurs up until the point where the voltage across capacitor 2 is close to the voltage across the terminals of battery 1. In the second period, main switch 7 is closed while switch 3 is open. Battery 1 directly maintains a charge in capacitor 2.

More precisely, during the pre-charging phase, control device 8 controls the opening of main switch 7 and performs PWM (pulse width modulation) of the transistor of switch 3, so as to achieve a practically constant current in resistor 5.

Control device 8 controls the conduction of the transistor of switch 3, which makes it possible to store energy in inductance 4 up until the point where the current achieves a first predetermined threshold S1 equal to M+X. When this first threshold S1 has been reached, the control system orders opening of the transistor of switch 3, and inductance 4 then releases its energy into capacitor 2 via resistor 5, diode 9 now acting as a free-wheeling diode, and finally diode 6. When the transistor of switch 3 closes, current passes from battery 1 to the capacitor 2, via inductance 4, resistor 5 and diode 6, the inductance 4 now storing energy. When the transistor of switch 3 is open, it is necessary for inductance 4 to be able to release its energy in the form of current, since there cannot be any current via the transistor of switch 3, and diode 9 makes it possible for the current to continue to circulate from inductance 4 to capacitor 2 via resistor 5, diode 6 and free-wheeling diode 9.

This transfer of energy from inductance 4 to capacitor 2 will bring about an increase in voltage across capacitor 2. As the energy in inductance 4 progressively decreases, the current in resistor 5 decreases and, when the current falls below a second predefined threshold value S2 which is equal to M−X, then control device 8 will again control conduction of the transistor of switch 3 in order to once again start a recharging phase of energy in inductance 4. In a preferred example, M is equal to 3 amps, S1 is equal to 4.5 amps and S2 is equal to 1.5 amps. X is preferably equal to between 30% and 70% of M, for instance 50%.

This process of transferring energy into inductance 4 then into capacitor 2 continues up until a point where the voltage across capacitor 2 has practically reached the voltage across battery 1, if we neglect the voltage drop in diode 6. At this moment, control device 8 controls closing of the main switch 17 and the opening of the transistor of switch 3, since the process of pre-charging can be considered as terminated, and the process of what is strictly speaking charge maintenance can commence.

Figure 5:
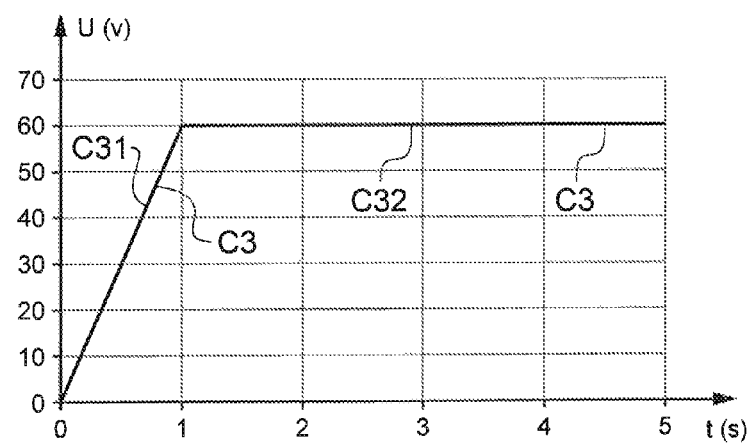
FIG. 5 shows diagrammatically an example of a pre-charging curve for a capacitor by means of a battery, using a pre-charging system according to the invention

FIG. 5 shows diagrammatically one example of a pre-charge curve using the pre-charging system according to the invention, for charging a capacitor by a battery. Curve C3 shows a variation in voltage U, expressed in volts V across the terminals of a capacitor 2 of a value of 50 mF, pre-charged from a 60 V battery 1 via a control system 8 which orders closing of the switch 3 for a current of 4.5 amps and opening thereof for a current of 1.5 amps, giving a mean current of 3 amps, as a function of time t, expressed in seconds s, and this with a frequency of the order of several tens of kilohertz.

Curve C3 shows the theoretical pre-charging curve comprising a first steady ramping up to reach the target voltage of 60 V, which corresponds to ramp C31, over, for example, 1 second, followed by a second phase of constant voltage at the value of the target voltage of 60 V, which corresponds to plateau C32. The portion of curve C31 is a ramp on a macroscopic scale in view of the high chopping frequency employed. If one were to zoom in heavily on ramp C31 it would be noticed that, in reality, this is a staircase curve the steps of which correspond to the succession of phases where the energy of battery 1 is stored in inductance 4, and is then restituted into capacitor 2. Each step of the staircase corresponds to a storage followed by restitution sequence.

In practice, only ramp C31 is employed, the pre-charging phase being halted at the end of ramp C31 or just after the beginning of plateau C32, in order to then be able to proceed with actual charge maintenance, which is performed at the target voltage value of 60 V. The pre-charging time in order to reach the target voltage, in the case of curve C3 of FIG. 5 corresponding to the pre-charging system described with reference to FIG. 4 in accordance with the invention, has been considerably reduced when compared to curve C1 in FIG. 2, corresponding to the pre-charging system described with reference to FIG. 1 which is that of the prior art.

The present invention is of course not limited to the examples and embodiment described and illustrated, but may be subject to numerous variants accessible to those skilled in the art.

What is claimed is:

1. A battery assembly comprising a battery and a pre-charging system for pre-charging a capacitor of a user device to which the battery assembly is to be connected, the pre-charging system comprising a switch and a limiting element for a charging current of said capacitor which are arranged whereby a charging current circulating between said battery and the capacitor passes therethrough, wherein the limiting element for limiting charging current of said capacitor is an energy transfer device.

2. The battery assembly according to claim 1, wherein the switch and the limiting element for limiting charging current of said capacitor constitute a system for chopping a current for charging the capacitor.

3. The battery assembly according to claim 2, wherein a chopping frequency is greater than one kHz.

4. The battery assembly according to claim 3, wherein the chopping frequency is greater than some tens or hundreds of kHz.

5. A battery assembly comprising a battery and a pre-charging system for pre-charging a capacitor of a user device to which the battery assembly is to be connected, the pre-charging system comprising a switch and limiting element for a charging current of said capacitor which are arranged whereby a charging current circulating between said battery and the capacitor passes therethrough, wherein the limiting element for limiting charging current of said capacitor is an inductance.

6. The battery assembly according to claim 5, wherein control of said switch is arranged whereby said switch is alternately closed and opened in order to alternately charge said inductance and discharge said inductance into said capacitor.

7. The battery assembly according to claim 6, wherein control of said switch is arranged whereby the switch is alternately opened and closed at a periodic frequency, greater than one kHz.

8. The battery assembly according to claim 7, wherein control of said switch is arranged whereby the switch is alternately opened and closed at a periodic frequency greater than some tens or hundreds of kHz.

9. The battery assembly according to claim 6, wherein control of said switch is arranged whereby said switch is alternately closed and opened in order to alternately charge said inductance up to a first predetermined threshold current value and discharge said inductance into said capacitor down to a second predetermined current threshold value which is strictly below said first threshold value.

10. The battery assembly according to claim 9, wherein the second threshold value is less than half said first threshold value.

11. The battery assembly according to claim 5, wherein the pre-charging system further includes a resistor connected in series between said inductance and said capacitor.

12. The battery assembly according to claim 11, wherein said resistor has a value comprised between 10 mohms and 1 ohm.

13. The battery assembly according to claim 5, wherein the pre-charging system further includes a diode connected in series between said inductance and said capacitor, so as to only allow current to pass in the direction from said inductance to said capacitor.

14. The battery assembly according to claim 5, wherein the switch is a transistor commanded by pulse width modulation.

15. The battery assembly according to claim 5, wherein the pre-charging system is a system for pre-charging a low voltage battery.

16. The battery assembly according to claim 15, wherein the terminal voltage of low voltage battery is less than 100 V.

17. The battery assembly according to claim 5, wherein said inductance has a value comprised between 10 microhenry and 1 millihenry.

18. A battery assembly comprising a battery and a charging system for charging a capacitor of a user device to which the battery assembly is to be connected, the charging system comprising a main switch connected in parallel with a system for pre-charging said capacitor by said battery, the pre-charging system comprising a switch and limiting element for a charging current of said capacitor which are arranged whereby a charging current circulating between said battery and the capacitor passes therethrough, wherein control of said main switch is arranged whereby the main switch is open when the pre-charging system is functioning, said main switch directly connecting said battery to said capacitor, the limiting element for limiting charging current of said capacitor being an inductance.

19. A method for pre-charging a capacitor of a user device by a battery of a battery assembly, wherein the battery assembly comprises a battery and a pre-charging system for pre-charging the capacitor, the pre-charging system comprising a switch and a limiting element for a charging current of said capacitor which are arranged whereby a charging current circulating between said battery and the capacitor passes therethrough, wherein the limiting element for limiting charging current of said capacitor is an energy transfer device, the method including the steps of alternately:
  charging said limiting element by said battery;
  discharging said limiting element into said capacitor.

20. The method for pre-charging according to claim 19, wherein alternation of said charging step and said discharge step is performed several times.

21. A battery assembly comprising a battery and a system for charging a capacitor of a user device, the charging system comprising a main switch connected in parallel with a system for pre-charging said capacitor by said battery, the pre-charging system comprising a switch and limiting element for a charging current of said capacitor which are arranged whereby a charging current circulating between said battery and the capacitor passes therethrough, characterized in that control of said main switch is arranged whereby the main switch is open when the pre-charging system is functioning, said main switch directly connecting said battery to said capacitor, the limiting element for limiting charging current of said capacitor being an energy transfer device.

* * * * *